United States Patent
Watanabe et al.

(10) Patent No.: US 7,652,105 B2
(45) Date of Patent: Jan. 26, 2010

(54) METHOD FOR PRODUCING HYDROXYL-MODIFIED ETHYLENE-α-OLEFIN COPOLYMER

(75) Inventors: Yasumasa Watanabe, Aichi (JP); Tomoyuki Nakamura, Aichi (JP); Hiroshi Okada, Tokoname (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 10/538,869

(22) PCT Filed: Dec. 25, 2003

(86) PCT No.: PCT/JP03/16662

§ 371 (c)(1), (2), (4) Date: Jun. 14, 2005

(87) PCT Pub. No.: WO2004/060933

PCT Pub. Date: Jul. 22, 2004

(65) Prior Publication Data

US 2006/0025537 A1 Feb. 2, 2006

(30) Foreign Application Priority Data

Dec. 27, 2002 (JP) ............... 2002-379025

(51) Int. Cl.
*C08C 19/04* (2006.01)
*C08F 8/06* (2006.01)
*C08F 236/20* (2006.01)

(52) U.S. Cl. ............... 525/387; 525/331.7; 525/332.1; 525/332.8

(58) Field of Classification Search ............... 525/331.7, 525/332.1, 332.8, 387
See application file for complete search history.

(56) References Cited

U.S. PATENT DOCUMENTS

| 3,105,057 | A | * | 9/1963 | Medalia | ............... 524/579 |
| 4,460,750 | A | | 7/1984 | Thiersault et al. | |
| 4,891,146 | A | * | 1/1990 | Stemke | ............... 508/312 |
| 4,897,452 | A | | 1/1990 | Berrier et al. | |
| 4,943,658 | A | * | 7/1990 | Kinoshita et al. | ......... 562/512.2 |
| 2002/0119319 | A1 | * | 8/2002 | Funaki et al. | ............... 428/421 |

FOREIGN PATENT DOCUMENTS

| EP | 0 123 424 | | 10/1984 |
| EP | 0 161 774 | | 11/1985 |
| EP | 0 284 425 | | 9/1988 |
| EP | 1 013 673 | * | 6/2000 |
| GB | 1145883 | | 3/1969 |
| JP | 03-258845 | | 11/1991 |
| JP | 09-077826 | | 3/1997 |
| JP | 09-241448 | | 9/1997 |
| JP | 63265925 | | 11/1998 |
| WO | WO 03/078487 | | 9/2003 |
| WO | WO 03/078487 A1 | * | 9/2003 |

OTHER PUBLICATIONS

International Search Report for PCT/JP03/16662 dated Apr. 20, 2004.
European Search Report, EP 03768199, Nov. 2006.

* cited by examiner

*Primary Examiner*—Roberto Rábago
(74) *Attorney, Agent, or Firm*—Nixon & Vanderhye P.C.

(57) ABSTRACT

A hydroxyl-modified ethylene-α-olefin copolymer with excellent coating properties and adhesion properties are produced by heating a mixture containing 100 parts by weight of an ethylene-α-olefin copolymer and 0.1 to 20 parts by weight of a peroxide having a hydroperoxy group. The heating temperature is adjusted within a range from the 10-hour half-life temperature to the 1-minute half-life temperature of the peroxide.

8 Claims, No Drawings

US 7,652,105 B2

METHOD FOR PRODUCING HYDROXYL-MODIFIED ETHYLENE-α-OLEFIN COPOLYMER

This application is the US national phase of international application PCT/JP2003/016662 filed 25 Dec. 2003 which designated the U.S. and claims benefit of JP 2002-379025, filed 27 Dec. 2002, the entire contents of each of which are hereby incorporated by reference.

FIELD OF THE INVENTION

The present invention relates to a method for producing hydroxyl-modified ethylene-α-olefin copolymer without cross-linking or degrading an ethylene-α-olefin copolymer.

BACKGROUND OF THE INVENTION

Ethylene-α-olefin copolymers such as an ethylene-propylene bipolymer (hereinafter abbreviated as EPM) and ethylene-propylene-nonconjugated diene terpolymer (hereinafter abbreviated as EPDM) are excellent in moldability, mechanical properties, water resistance, weatherability, heat resistance and chemical resistance, and are therefore being used in many fields of, for example, car components, home electric appliances and office equipment. In addition, since thermoplastic elastomers obtained by blending an ethylene-α-olefin copolymer and polyolefin resin such as polypropylene and polyethylene have excellent properties and recyclability, they are now attracting attention mainly in terms of applications to automobiles.

However, ethylene-α-olefin copolymers and the aforementioned thermoplastic elastomers have a defect that because they do not have a polar functional group in the molecule, their affinity with other substances is poor, and thus the coatability and the adhesiveness are quite inferior.

To overcome the above defect, an attempt to introduce a hydroxyl group, which is a polar functional group, into the structure of an ethylene-α-olefin copolymer, that is, to modify the ethylene-α-olefin copolymer with hydroxyl groups, has been variously studied. For example, a method comprising epoxidizing a double bond in EPDM using hydrogen peroxide and then conducting hydrolysis has been disclosed (e.g., see Patent Document 1). Furthermore, a method of grafting in which a vinyl monomer having a hydroxyl group, such as 2-hydroxyethyl methacrylate, is reacted with a mixture of EPM and polypropylene in the presence of a radical generator such as dialkyl peroxide has been proposed (e.g., see Patent Document 2).

[Patent Document 1] Japanese Patent Laid-Open Publication No. 9-241448 (p.7)

[Patent Document 2] Japanese Patent Laid-Open Publication No. 3-258845 (pp.4 to 5)

However, the method described in Patent Document 1 is a two-stage process, which also requires use of a great amount of organic solvent such as toluene to dissolve EPDM, and the method was thus complex and economically disadvantageous. In addition, the method had an essential problem that it cannot be applied to ethylene-α-olefin copolymers which do not contain a double bond.

In addition, the method described in Patent Document 2 had a problem that because polymer radicals produced by a radical generator such as dialkyl peroxide react with each other to be cross-linked, or suffer from decomposition before reacting with a vinyl monomer to cross-link or degrade the resin, thereby damaging the processability and the properties of the resin. Further, because of occurrence of homopolymerization of vinyl monomers or loss of ester moieties to which a hydroxyl group is bonded caused by hydrolysis, it was also difficult to introduce a hydroxyl group efficiently.

SUMMARY OF THE INVENTION

The present invention has been made in view of the problems of conventional arts, and an object of the present invention is to provide a hydroxyl-modified ethylene-α-olefin copolymer excellent in coatability and adhesiveness and an efficient method for producing the copolymer.

The inventors of the present invention have conducted intensive studies to achieve the above-mentioned object and have found that an ethylene-α-olefin copolymer can be efficiently hydroxylated by mixing a specific peroxide with the copolymer and heating them, whereby a hydroxyl-modified ethylene-α-olefin copolymer excellent in coatability and adhesiveness can be obtained, and the present invention has been completed.

An aspect of the present invention is a method for producing a hydroxyl-modified ethylene-α-olefin copolymer, which comprises the steps of: mixing 100 parts by weight of an ethylene-α-olefin copolymer and 0.1 to 20 parts by weight of a peroxide having a hydroperoxy group and heating a mixture containing the peroxide and the ethylene-α-olefin copolymer at a temperature ranging between a 10-hour half-life temperature and a 1-minute half-life temperature of the peroxide.

Another aspect of the present invention is a method for producing a hydroxyl-modified ethylene-α-olefin copolymer, which comprises the steps of: mixing 100 parts by weight of an ethylene-α-olefin copolymer, 0.1 to 20 parts by weight of a peroxide having a hydroperoxy group and a radical generator having a 10-hour half-life temperature not higher than the 10-hour half-life temperature of the peroxide and having a radical generating group, the radical generator being added so that not more than 1 mole of the radical generating groups are present with respect to 1 mole of the hydroperoxy groups, and heating a mixture containing the ethylene-α-olefin copolymer, the peroxide and the radical generator at a temperature ranging between a 10-hour half-life temperature of the radical generator and 220° C.

Still another aspect of the present invention is a method for producing a hydroxyl-modified ethylene-α-olefin copolymer, which comprises the steps of: mixing 100 parts by weight of an ethylene-α-olefin copolymer, 0.1 to 20 parts by weight of a peroxide having a hydroperoxy group and a radical generator having a 1 minute half-life temperature not higher than 195° C. and having a radical generating group, the radical generator being added so that not more than 1 mole of the radical generating groups are present with respect to 1 mole of the hydroperoxy groups, heating a mixture containing the ethylene-α-olefin copolymer, the peroxide and the radical generator and heating a mixture containing the ethylene-α-olefin copolymer, the peroxide and the radical generator at a temperature ranging between a 10-hour half-life temperature of the radical generator and 220° C.

The peroxide is preferably t-butyl hydroperoxide, t-amyl hydroperoxide, t-hexyl hydroperoxide, t-octyl hydroperoxide, cumene hydroperoxide or diisopropylbenzene hydroperoxide.

In an embodiment, said mixing includes kneading.

The ethylene-α-olefin copolymer preferably has Mooney viscosity of 10 to 250 at 100° C.

The radical generator is preferably a compound having a 1-minute half-life temperature not higher than 195° C.

In an embodiment, the ethylene-α-olefin copolymer is a bipolymer of ethylene and α-olefin or a terpolymer of ethylene, an α-olefin and a nonconjugated diene.

The present invention also provides a hydroxyl-modified ethylene-α-olefin copolymer which contains 0.001 to 1 mole of hydroxyl groups per 1 kg of the modified copolymer and has Mooney viscosity of 10 to 250 at 100° C.

The present invention also provides a hydroxyl-modified ethylene-α-olefin copolymer composition comprising the above-mentioned hydroxyl-modified ethylene-α-olefin copolymer and at least one member selected from the group consisting of a thermoplastic resin, a filler, an antioxidant, a light stabilizer, a plasticizer, a lubricant, a flame retardant and a colorant.

DETAILED DESCRIPTION OF THE PREFERRED EMBODIMENTS

In the following, embodiments of the present invention are described in detail.

The present invention relates to a method for producing a hydroxyl-modified ethylene-α-olefin copolymer, which includes a step of heating an ethylene-α-olefin copolymer in the presence of a peroxide having a hydroperoxy group.

The raw material copolymer, i.e., an ethylene-α-olefin copolymer is obtained by copolymerization of a monomer mixture containing ethylene and α-olefin, and the copolymer is preferably a bicopolymer of ethylene-α-olefin or a terpolymer of ethylene-α-olefin-nonconjugated diene.

Examples of the α-olefin include α-olefins having 3 to 20 carbon atoms such as propylene, butene-1, pentene-1,2-methylbutene-1,3-methylbutene-1, hexene-1,3-methylpentene-1,4-methylpentene-1,3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylheptene-1, diethylhexene-1, dodecene-1, tetradecene-1, hexadecene-1, octadecene-1 and eicosane-1. These may be used alone or in a combination of two or more. Of these, preferred is propylene in that hydroxyl groups can be efficiently introduced by hydrogen abstraction.

Examples of the nonconjugated diene include 5-ethylidene-2-norbornene, dicyclopentadiene, tricyclopentadiene, 5-methyl-2,5-norbornadiene, 5-methylene-2-norbornene, 5-isopropenyl-2-norbornene, 5-(1-butenyl)-2-norbornene, cyclooctadiene, vinylcyclohexene, 1,5,9-cyclododecatriene, 6-methyl-4,7,8,9-tetrahydroindene, 2,2'-dicyclopentenyl, trans-1,2-divinylcyclobutane, 2-methyl-1,4-hexadiene, 1,6-octadiene, 1,7-octadiene, 1,4-hexadiene, 1,8-nonadiene, 1,9-decadiene, 3,6-dimethyl 1,7-octadiene, 4,5-dimethyl-1,7-octadiene, 1,4,7-octatriene, 5-methyl-1,8-donadiene, dicyclooctadiene, methylenenorbornene and 5-vinyl-2-norbornene. These may be used alone or in a combination of two or more.

Of these nonconjugated dienes, preferred are 5-ethylidene-2-norbornene, dicyclopentadiene and 1,9-decadiene, and particularly preferred are 5-ethylidene-2-norbornene and dicyclopentadiene.

Of such ethylene-α-olefin copolymers, an ethylene-propylene copolymer and an ethylene-propylene-5-ethylidene-2-norbornene copolymer are preferable in that hydroxyl groups can be efficiently introduced by hydrogen abstraction.

The proportion of use of each component of the ethylene-α-olefin copolymer is not particularly limited, but those with a weight fraction of each component of 0.2-0.8/0.2-0.8/0-0.2 (described in the order of ethylene/α-olefin/nonconjugated diene, unit: weight ratio) are preferable from the viewpoint that cross-linking or degradation occurs less frequently. In particular, when the proportion of the nonconjugated diene is more than 0.2, the ethylene-α-olefin copolymer has too many active points and side reactions such as cross-linking tend to occur easily.

The Mooney viscosity $ML_{1+4}$ at 100° C. of the raw material copolymer, i.e., an ethylene-α-olefin copolymer, is preferably 10 to 250, more preferably 15 to 200, further preferably 20 to 100, and particularly preferably 20 to 50. When the Mooney viscosity is less than 10, efficiency of introducing hydroxyl groups tends to decrease. On the other hand, when it is more than 250, cross-linking or degradation tends to occur easily. In the present invention, the Mooney viscosity is measured according to the method specified in JIS K6300-1.

Examples of the peroxide having a hydroperoxy group (OOH group) used in the present invention include hydrogen peroxide, ketone peroxides such as methyl ethyl ketone peroxide, cyclohexanone peroxide and methylcyclohexanone peroxide; hydroperoxides such as t-butyl hydroperoxide (167° C., 261° C.), t-amyl hydroperoxide, t-hexyl hydroperoxide, t-octyl hydroperoxide (153° C., 247° C.), 2,5-dimethyl-2,5-dihydroperoxy hexane, cumene hydroperoxide (158° C., 254° C.), diisopropylbenzene monohydroperoxide (145° C., 233° C.), diisopropylbenzene dihydroperoxide, p-menthan hydroperoxide (128° C., 200° C.) and pinane hydroperoxide; and organic peracids such as perbenzoic acid and metachloroperbenzoic acid. These may be used alone or in a combination of two or more. Referring to the temperatures in parentheses, the former indicates 10-hour half-life temperature and the latter indicates 1-minute half-life temperature.

Of these, hydroperoxides are preferable, and t-butyl hydroperoxide, t-amyl hydroperoxide, t-hexyl hydroperoxide, t-octyl hydroperoxide, cumene hydroperoxide and diisopropylbenzene hydroperoxide are particularly preferable, because they can be easily melted with or dissolved in an ethylene-α-olefin copolymer and thus the efficiency of introducing hydroxyl groups is high.

The amount to be used of the above-mentioned peroxide having a hydroperoxy group is in the range of usually 0.1 to 20 parts by weight, preferably 0.5 to 10 parts by weight with respect to 100 parts by weight of the ethylene-α-olefin copolymer. When the amount to be used of the peroxide having a hydroperoxy group is less than 0.1 part by weight, the amount of the hydroxyl groups introduced becomes small and therefore the effect of modifying an ethylene-α-olefin copolymer is insufficient. On the other hand, when the amount to be used of the peroxide having a hydroperoxy group is more than 20 parts by weight, cross-linking or degradation of the ethylene-α-olefin copolymer tends to occur easily.

The above-mentioned peroxide having a hydroperoxy group can be used by diluting with a solvent such as toluene, cumene or water, or an inert solid such as silica, as well as in a purified form.

In the present invention, by using the above-mentioned peroxide having a hydroperoxy group and a radical generator having a 10-hour half-life temperature not higher than the 10-hour half-life temperature of the peroxide together, the heating temperature can be advantageously lowered. The radical generator is a compound which has a radical generating group(s) such as a peroxide bond or an azo bond in a molecule. When the 10-hour half-life temperature of the radical generator is higher than the 10-hour half-life temperature of the peroxide having a hydroperoxy group, side reactions such as cross-linking and degradation occur due to polymer radicals generated by the radical generator. Preferred radical generators are compounds having a 1-minute half-life temperature of preferably not more than 195° C., more preferably 90 to 190° C. The term, 1-minute half-life temperature, refers to a temperature at which the initial concentration of the radical generator is halved in 1 minute, and this can be measured in a diluted solution of benzene etc.

Specific examples of the radical generator having a 1-minute half-life temperature not higher than 195° C. include dialkyl peroxides such as di-t-butyl peroxide (124° C., 186° C.), di-t-hexyl peroxide (116° C., 177° C.), t-butyl cumyl peroxide (120° C., 173° C.), dicumyl peroxide (116° C., 175° C.), α,α'-bis(t-butylperoxy)diisopropyl benzene (119° C., 175° C.), 2,5-dimethyl-2,5-bis(t-butylperoxy)hexane (118° C., 180° C.) and 2,5-dimethyl-2,5-bis(t-butylperoxy)hexyne-3 (128° C., 194° C.); peroxyketals such as n-butyl-4,4-bis(t-butylperoxy) valerate (105° C., 173° C.), 2,2-bis(t-butylperoxy)butane (103° C., 160° C.), 1,1-bis(t-butylperoxy)cyclohexane (91° C., 154° C.), 1,1-bis(t-hexylperoxy)cyclohexane (87° C., 149° C.), 1,1-bis(t-butylperoxy)-3,3,5-trimethylcyclohexane (90° C., 149° C.) and 1,1-bis(t-hexylperoxy)-3,3,5-trimethylcyclohexane (87° C., 147° C.); peroxy esters such as t-butyl peroxybenzoate (104° C., 167° C.), t-hexyl peroxybenzoate (99° C., 160° C.), t-butyl peroxyacetate (102° C., 160° C.), t-butyl peroxylaurate (98° C., 159° C.), t-butyl peroxy-3,3,5-trimethylhexanoate (97° C., 166° C.), t-butyl peroxymaleic acid (96° C., 168° C.), t-butyl peroxyisobutyrate (77° C., 136° C.), t-butyl peroxy-2-ethylhexanoate (72° C., 134° C.), t-butyl peroxypivalate (55° C., 110° C.), t-butyl peroxyneodecanoate (46° C., 104° C.) and cumyl peroxyneodecanoate (37° C., 94° C.); peroxymonocarbonates such as t-butyl peroxy-2-ethylhexylmonocarbonate (99° C., 161° C.), t-butyl peroxyisopropylmonocarbonate (99° C., 159° C.) and t-hexyl peroxyisopropylmonocarbonate (95° C., 155° C.); diacyl peroxides such as benzoyl peroxide (74° C., 130° C.), 4-methylbenzoyl peroxide (71° C., 128° C.), lauroyl peroxide (62° C., 116° C.) and 3,3,5-trimethyl hexanoyl peroxide (59° C., 113° C.); peroxydicarbonates such as bis(2-ethylhexyl)peroxydicarbonate (44° C., 91° C.), bis(4-t-butylcyclohexyl)peroxydicarbonate (41° C., 92° C.), dicyclohexyl peroxydicarbonate, di-sec-butyl peroxydicarbonate (41° C., 92° C.) and diisopropyl peroxydicarbonate (41° C., 88° C.); and azo compounds such as 2,2'-azobis(isobutylonitrile) (64° C.), 2,2'-azobis(2,4-dimethylvaleronitrile) (52° C.), 1,1'-azobis (cyclohexane carbonitrile) (88° C.) and 2-(t-butylazo)-2-methylbutanenitrile (82° C.) These may be used alone or in a combination of two or more.

Referring to the temperatures in parentheses, the former indicates 10-hour half-life temperature and the latter indicates 1-minute half-life temperature. In this regard, for the azo compounds, 10-hour half-life temperatures alone are described.

Of the radical generators, preferred are organic peroxides, and particularly preferred are those which have a high radical generation efficiency (ratio of radicals acting effectively among the radicals) and a high hydrogen abstraction ability, such as di-t-butylperoxide,t-butylcumyl peroxide, dicumyl peroxide, α,α'-bis(t-butylperoxy)diisopropylbenzene, 2,5-dimethyl-2,5-bis(t-butylperoxy)hexane, 1,1-bis(t-butylperoxy)cyclohexane, 1,1-bis(t-butylperoxy)-3,3,5-trimethylcyclohexane, t-butylperoxybenzoate, t-butyl peroxy-2-ethylhexylmonocarbonate, t-butyl peroxy isopropylmonocarbonate, benzoyl peroxide, 4-methylbenzoyl peroxide, bis(2-ethylhexyl)peroxydicarbonate, bis(4-t-butylcyclohexyl)peroxydicarbonate, dicyclohexylperoxydicarbonate, di-sec-butyl peroxydicarbonate and diisopropyl peroxydicarbonate.

The amount to be used of the radical generator is such that not more than 1 mole, preferably not more than 0.8 mole of radical generating groups are present with respect to 1 mole of the hydroperoxy groups of the aforementioned peroxide. When more than 1 mole of radical generating groups are present, side reactions such as cross-linking and degradation tend to occur easily due to polymer radicals generated by the radical generator.

In the present invention, the method of mixing each component is not particularly limited and includes all known methods. Specific examples of the method include a method of using an apparatus for mechanical mixing such as a Henschel mixer, a method of forming a solution using a solvent including saturated aliphatic hydrocarbons such as n-hexane, n-heptane, isooctane, cyclohexane and cyclopentane; aromatic hydrocarbons such as benzene, toluene and xylene; and halogenated hydrocarbons such as chlorobenzene, dichloromethane and methylene chloride, and a method of kneading using a roll, a kneader, a kneader-ruder, a Banbury mixer or an extruder. The method of using an apparatus for mechanical mixing such as a Henschel mixer is incapable of mixing all components sufficiently and thus the property of homogeneous mixing is poor. Therefore, it is desirable to use the method of kneading.

Of these methods, the method of preparing a mixture by kneading is preferable from the viewpoint of economical efficiency, the property of homogeneous mixing and the avoidance of side reactions in which a solvent is involved, such as a reaction in which hydroxyl groups are introduced to a solvent.

The method of heating is not particularly limited, but for example, heating is conducted by using a melt kneader or a hot press. For the melt kneader, an apparatus in which kneading means such as a uniaxial or biaxial extruder, a Banbury mixer, a kneader, a kneader ruder or a roll is combined with heating means may be used. In that case, for the timing of heating, heating may be conducted simultaneously with mixing or after kneading according to need.

When using peroxide without using a radical generator, the heating temperature may be from a 10-hour half-life temperature to a 1-minute half-life temperature of the peroxide having a hydroperoxy group, which is preferably 140 to 250° C. The term, 10-hour half-life temperature, refers to a temperature at which the initial concentrations of the peroxide and the radical generator are halved in 10 hours, and these can be measured in a diluted solution of benzene etc. When the heating temperature is lower than the 10-hour half-life temperature, the rate of decomposing the peroxide having a hydroperoxy group is low and therefore the efficiency of introducing hydroxyl groups tends to be lowered. On the other hand, when the heating temperature is higher than the 1-minute half-life temperature, the ethylene-α-olefin copolymer may be decomposed.

The heating temperature in the case of using peroxide and a radical generator together is from a 10-hour half-life temperature of the radical generator to 220° C., preferably 50 to 200° C. When the heating temperature is lower than the 10-hour half-life temperature, the rate of generating radicals of the radical generator is low and therefore the efficiency of introducing hydroxyl groups tends to be lowered. In addition, when the heating temperature is higher than 220° C., the efficiency of introducing hydroxyl groups also tends to be lowered because the radical generator decomposes rapidly.

In the present invention, by adding, within the range that the object of the present invention is not damaged, at least one member selected from the group consisting of a thermoplastic resin, a filler, an antioxidant, a light stabilizer, a plasticizer, a lubricant, a flame retardant and a colorant to a hydroxyl-modified ethylene-α-olefin copolymer, a hydroxyl-modified ethylene-α-olefin copolymer composition to which a desired property suitable for purposes of use is imparted can be produced. The amount to be added is usually not more than 80% by weight, preferably not more than 50% by weight with respect to the composition.

Examples of the thermoplastic resin include polyolefins such as polyethylene and polypropylene. Examples of the filler include silica (white carbon), talc, clay, calcium carbonate, magnesium carbonate, barium sulfate and carbon black.

Examples of the antioxidant include phenol antioxidants such as 2,6-di-t-butyl-p-cresol, 4,4'-thiobis(3-methyl-6-t-butylphenol) and tetrakis-[methylene-3-(3',5'-di-t-butyl-4'-hydroxyphenyl)propionate]methane; amine antioxidants such as phenyl β-naphthyl amine and α-naphthyl amine; sulfur antioxidants such as dilauryl thiodipropionate and distearyl thiodipropionate; and phosphorus antioxidants such as triphenyl phosphite and tris(nonylphenyl) phosphite.

Examples of the light stabilizer include salicylic acid stabilizers such as phenyl salicylate; and benzophenone stabilizers such as 2-hydroxy-4-methoxybenzophenone; and benzotriazole stabilizers such as 2-(2'-hydroxy-5'-methylphenyl) benzotriazole.

Examples of the plasticizer include phthalate esters such as di-2-ethylhexyl phthalate, aliphatic dibasic esters such as di-2-ethylhexyl adipate, phosphate esters such as tributyl phosphate and process oils such as paraffin oil, aromatic oil and naphthene oil.

Examples of the lubricant include hydrocarbons such as liquid paraffin, fatty acids such as stearic acid, fatty acid amides such as stearic acid amide, esters such as butyl stearate, alcohols such as stearyl alcohol, a mixture of these, and metal soap.

Examples of the colorant include carbon black, titanium oxide, zinc oxide, red iron oxide, ultramarine blue pigment, Prussianblue pigment, azo pigment, nitroso pigment, lake pigment and phthalocyanine pigment.

Examples of the flame retardant include halogen flame retardants such as chlorinated paraffin and tetrabromobisphenol A and combination use of these and antimony trioxide; phosphate ester flame retardants such as tricresyl phosphate; and inorganic flame retardants such as magnesium hydroxide.

The amount of hydroxyl groups introduced by the method of production of the present invention is preferably 0.001 to 1 mole, more preferably 0.005 to 1 mole, particularly preferably 0.01 to 0.5 mole per 1 kg of the hydroxyl-modified ethylene-α-olefin copolymer. The Mooney viscosity of the modified copolymer at 100° C. is preferably 10 to 250, more preferably 15 to 200, further preferably 20 to 100, and particularly preferably 20 to 50.

The hydroxyl-modified ethylene-α-olefin copolymer may be used as it is, but depending on the type of use or intended properties, it may be cross-linked, mixed with a different polymer, or mixed with such polymer while being cross-linked before it is used. For example, when the copolymer is mixed with or cross-linked while mixing with polyolefin such as propylene or polyethylene, the product may be used for automobile components or electric components.

In the present invention, the following mechanism of introducing hydroxyl groups to an ethylene-α-olefin copolymer can be presumed. Part of peroxides containing a hydroperoxy group(s) is decomposed by heating to generate oxygen-centered radicals which have a hydrogen abstraction ability. They abstract hydrogen from the ethylene-α-olefin copolymer to generate radicals of the ethylene-α-olefin copolymer. As the radicals of the ethylene-α-olefin copolymer attack the peroxide bond of the peroxide having a hydroperoxy group, that is, as induced decomposition occurs, hydroxyl groups are introduced to the ethylene-α-olefin copolymer. In short, according to the radical reaction, hydrogen atoms of the ethylene-α-olefin copolymer are replaced by hydroxyl groups of the peroxide having a hydroperoxy group. When the induced decomposition occurs, the reaction seems to progress as a chain reaction process because it involves generation of radicals having hydrogen abstraction ability.

By using a radical generator having a 1-minute half-life temperature not higher than 195° C. in combination, the temperature of chain initiation can be lowered, and therefore when introduction of hydroxyl groups at a lower temperature is intended, such combination use is preferable.

According to one embodiment, the following advantages can be obtained.

The method for producing a hydroxyl-modified ethylene-α-olefin copolymer of this embodiment comprises using, with respect to 100 parts by weight of an ethylene-α-olefin copolymer, 0.1 to 20 parts by weight a peroxide having a hydroperoxy group which has a high hydrogen abstraction ability, and heating the ethylene-α-olefin copolymer at a 10-hour half-life temperature to a 1-minute half-life temperature of the peroxide. According to this, hydroxyl groups are efficiently introduced to the ethylene-α-olefin copolymer without cross-linking or degradation, and a modified ethylene-α-olefin copolymer having improved coatability and adhesiveness can be easily obtained.

By using a peroxide having a hydroperoxy group and a radical generator having a 10-hour half-life temperature not higher than the 10-hour half-life temperature of the peroxide having a hydroperoxy group together, the heating temperature for introducing hydroxyl groups can be lowered.

By mixing raw materials according to a kneading method using a melt kneader, side reactions can be avoided and the homogeneous mixing property can be improved.

By setting the Mooney viscosity at 100° C. of the raw material ethylene-α-olefin copolymer to 10 to 250, the Mooney viscosity of the hydroxyl-modified ethylene-α-olefin copolymer to be obtained can be maintained in the same range.

The hydroxyl-modified ethylene-α-olefin copolymer to be produced contains 0.001 to 1 mole of hydroxyl groups per 1 kg. Therefore, the coatability and the adhesiveness of the surface of the ethylene-α-olefin copolymer can be improved by the hydroxyl groups.

By incorporating, into a hydroxyl-modified ethylene-α-olefin copolymer, at least one member selected from the group consisting of a thermoplastic resin, a filler, an antioxidant, a light stabilizer, a plasticizer, a lubricant, a flame retardant and a colorant, a composition to which a desired property suitable for purposes of use is imparted can be obtained.

Next, Examples and Comparative Examples of the present invention will be described. Part(s) and % described below are part(s) by weight and % by weight unless otherwise noted. Abbreviations in each Example indicate the following compounds.

TBHP: t-butyl hydropeoxide (available from NOF Corporation, product name: Perbutyl H-69, purity: 69%, 10-hour half-life temperature: 167° C., 1-minute half-life temperature: 261° C.)

CHP: cumene hydroperoxide (available from NOF Corporation, product name: Percumyl H-80, purity: 80%, 10-hour half-life temperature: 158° C., 1-minute half-life temperature: 254° C.)

PH3M: 1,1-bis(t-butylperoxy)-3,3,5-trimethylcyclohexane (available from NOF Corporation, product name: Perhexa 3M, purity: 90%, 10-hour half-life temperature: 90° C., 1-minute half-life temperature: 149° C.)

EPM: ethylene-propylene copolymer (available from JSR Corporation, product name: JSR EP11, Mooney viscosity $ML_{1+4}$ (100° C.) : 40)

EPDM: ethylene-propylene-5-ethylidene-2-norbornene copolymer (available from JSR Corporation, product name: JSR EP21, Mooney viscosity $ML_{1+4}$ (100° C.): 38)

PP: polypropylene (available from Idemitsu Petrochemical Co., Ltd., product name: J-5066HP)

Measuring Method of Amount of Introduced Hydroxyl Groups

To a flask was added 20 ml of xylene, 0.5 g of a heat-treated polymer sample, 0.4 g of acetic anhydride and 0.2 g of dimethylaminopyridine. The mixture was heated under reflux with stirring for about 30 minutes to dissolve the sample and conduct acetylation thereof.

The xylene solution was put in a large amount of methanol to reprecipitate the polymer. The reprecipitated polymer was dissolved in hot xylene and the mixture was added to methanol and reprecipitated. After drying the reprecipitated polymer, the dried polymer was formed into a film and the infrared absorption spectrum (IR) was measured. Based on the signal at $1740 cm^{-1}$ which suggests esterification of hydroxyl group, the amount of hydroxyl groups introduced to the polymer was quantitatively measured.

EXAMPLE 1

To 100 parts of EPM was added 2.6 parts of TBHP, and the mixture was kneaded by using a roll kneader to give a composition. The composition was heat-treated at 200° C. for 30 minutes by using a pressing machine. The Mooney viscosity of the heated material was then measured at 100° C. A portion of the heated material was taken to measure the amount of the hydroxyl groups introduced. The results are shown in Table 1.

EXAMPLES 2 TO 4

Experiment was conducted in accordance with Example 1 except that the kind and the amount of addition of peroxide in Example 1 were changed as shown in Table 1. The results are shown in Table 1.

Comparative Example 1

Experiment was conducted in accordance with Example 1 except that TBHP was not added. The results are shown in Table 1.

Comparative Example 2

Experiment was conducted in accordance with Example 1 except that 1.7 parts of PH3M was used instead of TBHP in Example 1. The results are shown in Table 1.

TABLE 1

| | Raw material copolymer | Peroxide | Amount added (parts by weight) | $ML_{1+4}$ at 100° C. | amount of hydroxyl groups introduced (mol/kg) |
|---|---|---|---|---|---|
| Ex. 1 | EPM | TBHP | 2.6 | 35 | 0.031 |
| Ex. 2 | 100 parts | TBHP | 1.3 | 37 | 0.022 |
| Ex. 3 | by weight | CHP | 1.9 | 38 | 0.024 |
| Ex. 4 | | CHP | 3.8 | 32 | 0.031 |
| Comp. Ex. 1 | | — | — | 38 | 0 |
| Comp. Ex. 2 | | PH3M | 1.7 | incapable measurement | — |

Note:
In Table 1, the amount of addition is indicated by part(s) by weight with respect to 100 parts by weight of EPM. In Comparative Example 2, the heated material was cross-linked and it was impossible to measure the Mooney viscosity.

The results in Table 1 suggest that when a peroxide with no hydroperoxy group is used (Comparative Example 2), cross-linking remarkably progressed; on the other hand, when a specific peroxide having a hydroperoxy group according to the present invention is used (Examples 1 to 4), hydroxyl groups are efficiently introduced with Mooney viscosity almost the same as that of the material to which peroxide was not added (Comparative Example 1). In other words, it has been found that hydroxyl groups can be introduced almost without cross-linking or degradation.

EXAMPLE 5

By using a roll kneader, 2.6 parts of TBHP and 1.7 parts of PH3M were added to 100 parts of EPDM and the mixture was kneaded. The obtained composition was heat-treated at 140° C. for 30 minutes by using a pressing machine. The Mooney viscosity of the heated material was then measured at 100° C. A portion of the heated material was taken to measure the amount of the hydroxyl groups introduced. The results are shown in Table 2.

EXAMPLES 6 TO 8

Experiment was conducted in accordance with Example 5 except that the kind and the amount of addition of peroxide in Example 5 were changed as shown in Table 2. The results are shown in Table 2.

Comparative Example 3

Experiment was conducted in accordance with Example 5 except that TBHP and PH3M were not added. The results are shown in Table 2.

Comparative Example 4

Experiment was conducted in accordance with Example 5 except that the amounts of addition of TBHP and PH3M in Example 5 were changed as in Table 2. The results are shown in Table 2.

TABLE 2

|  | Peroxide & Radical generator | Amount added (parts by weight) | Molar ratio | $ML_{1+4}$ at 100° C. | amount of hydroxyl groups introduced (mol/kg) |
|---|---|---|---|---|---|
| Ex. 5 | TBHP | 2.6 | 1 | 36 | 0.027 |
|  | PH3M | 1.7 | 0.51 |  |  |
| Ex. 6 | TBHP | 3.9 | 1 | 37 | 0.038 |
|  | PH3M | 1.7 | 0.34 |  |  |
| Ex. 7 | CHP | 3.8 | 1 | 30 | 0.026 |
|  | PH3M | 0.4 | 0.12 |  |  |
| Ex. 8 | CHP | 3.8 | 1 | 40 | 0.109 |
|  | PH3M | 1.7 | 0.51 |  |  |
| Comp. Ex. 3 | — | — | — | 35 | 0 |
| Comp. Ex. 4 | TBHP | 2.6 | 1 | incapable measurement | — |
|  | PH3M | 5.0 | 1.49 |  |  |

Note:
In Table 2, the amount of addition is indicated by part(s) by weight with respect to 100 parts by weight of EPDM. The molar ratio of addition is indicated by the molar ratio of peroxy bond. In Comparative Example 4, the heated material was cross-linked and it was impossible to measure the Mooney viscosity.

The results in Table 2 suggests that when the peroxide having a hydroperoxy group and the radical generator having a 1-minute half-life temperature not higher than 195° C. according to the present invention are used in a specific molar ratio (Examples 5 to 8), hydroxyl groups are efficiently introduced with Mooney viscosity almost the same as that of the material to which peroxide was not added (Comparative Example 3). In other words, it has been found that hydroxyl groups can be introduced almost without cross-linking or degradation.

When a radical generator is added in such an amount that more than 1 mole of the radical generating groups are present with respect to 1 mole of the hydroperoxy groups of the peroxide having a hydroperoxy group, cross-linking remarkably progressed (Comparative Example 4).

EXAMPLE 9

Using a Banbury mixer, 50 parts of PP, 50 parts of hydroxyl-modified EPM (EPM-1) obtained in Example 1 and 0.1 part of IRGANOX 1010 (antioxidant) were kneaded under conditions of a rotation number of 100 rpm and 170° C. for 10 minutes. The kneaded material was subjected to press molding at 180° C. to obtain a plate-like test piece. After wiping the surface of the test piece with trichloroethane, two-component urethane coating (available from BASF NOF Coatings Co., Ltd., product name: High-Urethane No. 5000) was coated thereon in a film thickness of about 60 μm, and the coating was baked under a condition of 120° C.×20 minutes to dry. Further, after leaving the coated material at room temperature overnight, 100 cross cuts of 1 mm by 1 mm were made in the formed coating and a piece of scotch tape was adhered thereon. When the tape was peeled off, peeling of the cross-cut coating was not observed.

Comparative Example 5

Experiment was conducted in accordance with Example 9 except that non-modified EPM was used instead of EPM-1 in Example 9. As a result, all pieces of the cross-cut coating peeled off.

EXAMPLE 10

Experiment was conducted in accordance with Example 9 except that the hydroxyl-modified EPDM (EPDM-5) obtained in Example 5 was used instead of hydroxyl-modified EPM in Example 9. As a result, peeling of the cross-cut coating was not observed.

Comparative Example 6

Experiment was conducted in accordance with Example 10 except that non-modified EPDM was used instead of EPDM-5 in Example 10. As a result, all pieces of the cross-cut coating peeled off.

Comparison of the results of Example 9 and Comparative Example 5 suggests that the polypropylene resin composition containing the hydroxyl-modified EPM of the present invention has an excellent coating adhesion property. Comparison of the results of Example 10 and Comparative Example 6 suggests that the polypropylene resin composition containing the hydroxyl-modified EPDM of the present invention has an excellent coating adhesion property.

EXAMPLE 11

Using a roll kneader, 3.8 parts of CHP was added to 100 parts of EPDM and after kneading the mixture, melt-kneading was conducted by using a Banbury mixer under conditions of a temperature of 180° C. and a rotation speed of 100 rpm for 10 minutes. The kneaded material had Mooney viscosity of 38 at 100° C. and the amount of hydroxyl groups introduced was 0.022 mol/kg.

Next, the obtained hydroxyl-modified EPDM (EPDM-11) was compressed with a pair of 0.1 mm-thick aluminum foils (available form Nippon Testpanel Co., Ltd.) interposing the copolymer therebetween, by using a mold of 120×120×0.8 mm under conditions of 200° C. and 35 MPa to prepare a test piece. The test piece was cut in a width of 25 mm and a T-type peeling test was conducted at a peeling rate of 50 mm/minute to measure the adhesion strength between the aluminum foil and the EPDM-11. The adhesion strength was 3.1 kg/cm.

Comparative Example 7

The adhesion strength was measured in accordance with Example 11 except that non-modified EPDM was used instead of EPDM-11 in Example 11. The adhesion strength was 0.6 kg/cm.

Comparison of the results of Example 11 and Comparative Example 7 suggests that the hydroxyl-modified EPDM of the present invention has an excellent adhesiveness.

The aforementioned embodiment can be modified as follows.

By using two or more kinds of peroxides containing a hydroperoxy group(s) which have different 10-hour half-life temperatures and 1-minute half-life temperatures in combination, the hydroxyl group content of the hydroxyl-modified ethylene-α-olefin copolymer can be adjusted.

It is also possible to facilitate hydroxyl-modification by irradiating with an actinic energy ray such as ultraviolet ray upon heat treatment. In that case, a photopolymerization initiator may be added.

The invention claimed is:

1. A method for producing a hydroxyl-modified ethylene-propylene-nonconjugated diene terpolymer, the method comprising:

kneading 100 parts by weight of an ethylene-propylene-nonconjugated diene terpolymer having a Mooney viscosity of 10 to 250 at 100° C. and 0.1 to 20 parts by weight of a peroxide having a hydroperoxy group to prepare a kneaded mixture essentially containing the peroxide and the ethylene-propylene-nonconjugated diene terpolymer, wherein the peroxide has a 10-hour half-life temperature and a 1-minute half-life temperature; and heating the kneaded mixture essentially containing the peroxide and the ethylene-propylene-nonconjugated diene terpolymer at a temperature equal to or exceeding the 10-hour half-life temperature of the peroxide having a hydroperoxy group and not higher than the 1-minute half-life temperature of the peroxide having a hydroperoxy group to introduce hydroxyl groups into the ethylene-propylene-nonconjugated diene terpolymer via hydrogen abstraction.

2. A method for producing a hydroxyl-modified ethylene-propylene-nonconjugated diene terpolymer, the method comprising:

kneading 100 parts by weight of an ethylene-propylene-nonconjugated diene terpolymer, 0.1 to 20 parts by weight of a peroxide having a hydroperoxy group, and a radical generator having a radical generating group so that not more than 1 mole of the radical generating groups are present with respect to 1 mole of the hydroperoxy groups to prepare a kneaded mixture essentially containing the ethylene-propylene-nonconjugated diene terpolymer, the peroxide and the radical generator, wherein said peroxide has a 10-hour half-life temperature and said radical generator has a 10-hour half-life temperature not higher than the 10-hour half-life temperature of the peroxide; and thereafter heating the kneaded mixture essentially containing the ethylene-propylene-nonconjugated diene terpolymer, the peroxide and the radical generator at a temperature equal to or exceeding the 10-hour half-life temperature of the radical generator and not higher than 220° C. to introduce hydroxyl groups into the ethylene-propylene-nonconjugated diene terpolymer via hydrogen abstraction.

3. The method according to claim 2, wherein the peroxide is t-butyl hydroperoxide, t-amyl hydroperoxide, t-hexyl hydroperoxide, t-octyl hydroperoxide, cumene hydroperoxide or diisopropylbenzene hydroperoxide.

4. The method according to claim 2, wherein the ethylene-propylene-nonconjugated diene terpolymer has Mooney viscosity of 10 to 250 at 100° C.

5. The method according to claim 2, wherein the radical generator is a compound having a 1-minute half-life temperature not higher than 195° C.

6. The method according to claim 1, wherein the peroxide is t-butyl hydroperoxide, t-amyl hydroperoxide, t-hexyl hydroperoxide, t-octyl hydroperoxide, cumene hydroperoxide or diisopropylbenzene hydroperoxide.

7. The method according to claim 1, wherein said heating includes replacing a hydrogen atom of the ethylene-propylene-nonconjugated diene terpolymer by a hydroxyl group of the peroxide having a hydroperoxy group.

8. The method according to claim 2, wherein said heating includes replacing a hydrogen atom of the ethylene-propylene-nonconjugated diene terpolymer by a hydroxyl group of the peroxide having a hydroperoxy group.

* * * * *